Figures 1, 2, 3, 4:
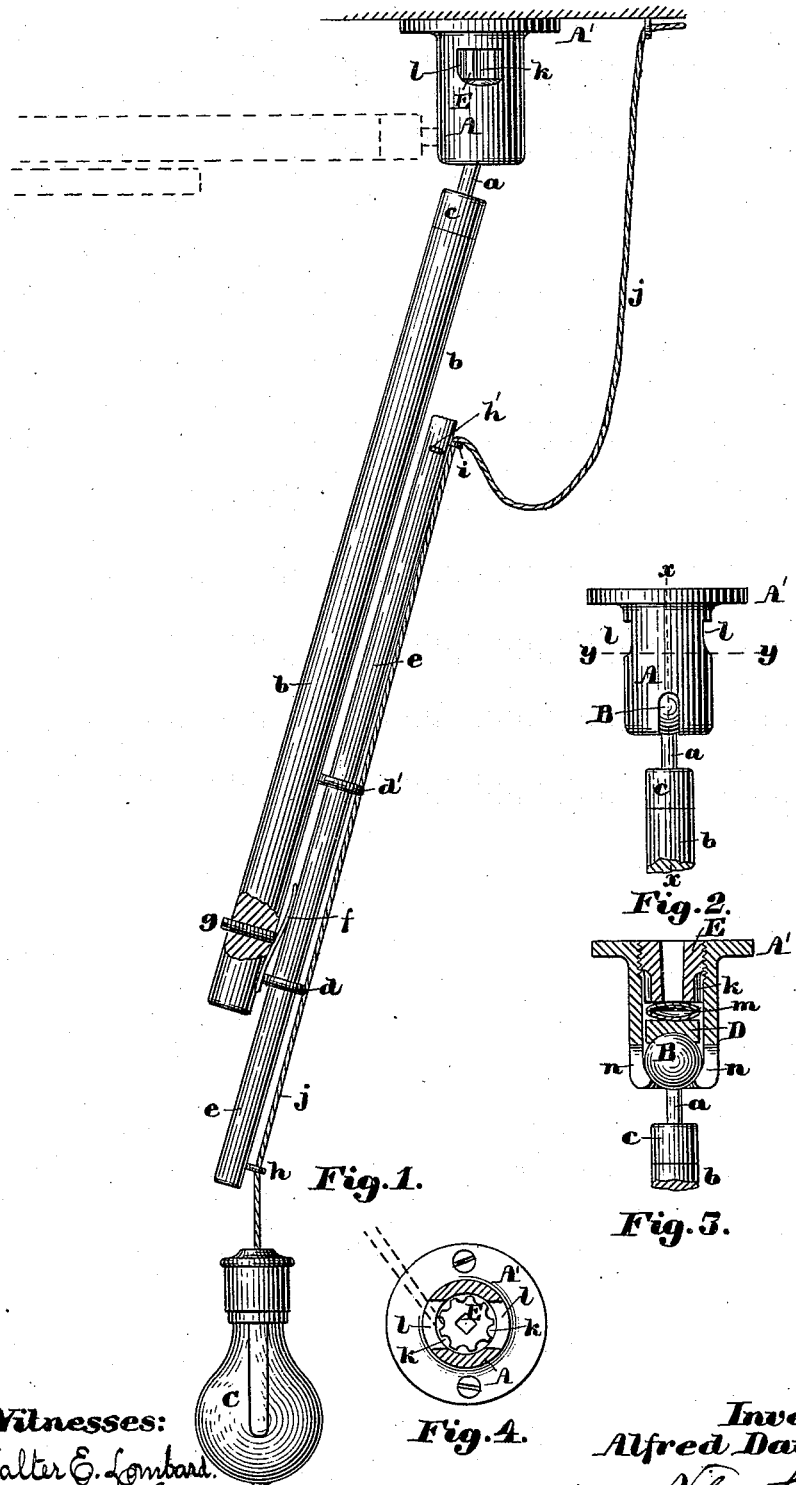

(No Model.)

A. DAWES.
ELECTRIC LIGHT SUPPORT.

No. 414,798. Patented Nov. 12, 1889.

Witnesses:
Walter E. Lombard
Geo. A. Sewall

Inventor:
Alfred Dawes,
by N. C. Lombard
Attorney.

UNITED STATES PATENT OFFICE.

ALFRED DAWES, OF CHELSEA, MASSACHUSETTS.

ELECTRIC-LIGHT SUPPORT.

SPECIFICATION forming part of Letters Patent No. 414,798, dated November 12, 1889.

Application filed May 28, 1889. Serial No. 312,361. (No model.)

*To all whom it may concern:*

Be it known that I, ALFRED DAWES, of Chelsea, in the county of Suffolk and State of Massachusetts, have invented certain new and useful Improvements in Electric-Light Supports, of which the following, taken in connection with the accompanying drawings, is a specification.

My invention relates to supports for incandescent electric lights, and is an improvement upon the invention described in the Letters Patent No. 394,680, granted to me December 18, 1888; and it consists in certain novel features of construction, arrangement, and combination of parts, which will be readily understood by reference to the description of the drawings, and to the claims to be hereinafter given, and in which my invention is clearly pointed out.

Figure 1 of the drawings is an elevation of an incandescent-light support embodying my invention. Fig. 2 is an elevation of the socket and a small portion of the light-supporting arm viewed from a position at right angles to Fig. 1. Fig. 3 is a section through said socket on line $x$ $x$ on Fig. 2, and showing the ball and a small portion of the light-supporting arm in elevation; and Fig. 4 is a transverse section through said socket on line $y$ $y$ on Fig. 2, and showing the screw-plug in inverted plan.

In the light-support described and illustrated in my before-cited patent the light-supporting arm was made in two parts, fitted one within the other, so as to be telescopically adjustable in length. This involved making one at least of said parts of metal in the form of a tube, which was somewhat expensive and made said arm somewhat heavier than was desirable. Owing to the construction of the socket in which was mounted the ball on the end of said supporting-arm and the arrangement of the saddle, spring, and screw-plug for regulating the friction on said ball, the supporting-arm could be moved only about thirty degrees in any direction from its central position, and the friction on the ball could only be regulated by removing the socket from its attachment to the building, so as to obtain access to the rear or upper end of the said screw-plug to screw it in or out, as might be required.

To obviate these several objections and make it practical to move said supporting-arm at least ninety degrees from its central position in one or more directions, to adjust the screw-plug or set-screw so as to increase or diminish the friction on the ball without removing the socket from its attachment to the building, and lessen the weight and cheapen the construction of the supporting-arm are the objects of my present invention.

In the drawings, A is a metal stand, provided with the flange A', by which and suitable screws it may be secured to the ceiling, wall, or other fixed object, the cylindrical hub of which is made hollow or in the form of a tube, the opening through which is contracted at the end opposite to the flange A' to a diameter less than the diameter of the ball B to be inserted therein.

The ball B is provided with the stem or shank $a$, which is secured in the end of the wooden rod $b$, which is strengthened by the ferrule $c$, fitted thereon, and has inserted in its side near its opposite end the two metal screw-eyes $d$ and $d'$, substantially such as are used for attaching the cords to picture-frames for hanging the same. Another wooden rod $e$, of smaller diameter than $b$, is fitted to bearings in said screw-eyes, in which it may be moved endwise at will.

Between the two rods $b$ and $e$, and firmly secured to $b$ by the screw-eye $d$, is placed a spring $f$, the free end of which presses against the side of the rod $e$ to force it hard against its bearings, and creates sufficient friction to hold said rod in any position to which it may be adjusted, the tension of said spring $f$ being regulated by the set-screw $g$, as shown in Fig. 1. The rod $e$ has set therein, near its front or lower end, the screw-eye $h$, and near its other end the wire staple $i$, through which the conducting wire or cable $j$ passes to the lamp C, the staple $i$ being so applied to the rod $e$ as to firmly clamp said wire or cable to the rod $e$, so that it cannot be moved through said staple without partially withdrawing said staple. The screw-eye $h$ and the pin or eye $h'$ serve as stops to limit the amount of endwise movement that can be given to the rod $e$.

D is a saddle in the form of a circular disk, having one of its faces concaved to fit the convex surface of the ball B, against which it bears within the socket A, as shown.

E is the screw for adjusting the friction on the ball B, having a male screw-thread formed upon about one-half its length, and upon the other half of its length having a series of teeth or serrations $k$ formed, by means of which and any suitable tool, as a nail-set, said screw may be revolved by inserting said tool through one of the slots $l\ l$, formed in the socket-stand A near its flange A', as shown in Fig. 4, said tool being indicated by dotted lines in said figure.

Between the screw E and the saddle D are placed two concavo-convex steel disks $m$, which serve as springs to render the pressure on the ball somewhat elastic.

The end of the socket A opposite the flange A' has cut through its wall a slot or slots $n$ of a width sufficient to receive the shank $a$ of the ball B and of suitable depth in the direction of the length of the socket to permit the supporting-arm to be moved into a position parallel to the ceiling or wall to which the socket is attached, as indicated in dotted lines in Fig. 1. By this arrangement the support, when the light is not desired for use, can be swung entirely out of the way, which is a great advantage, especially in cases where the light is used for lighting machinists' and other mechanics' benches and tools.

What I claim as new, and desire to secure by Letters Patent of the United States, is—

1. The combination of the rod $b$, having the screw-eyes $d$ and $d'$, the rod $e$, mounted in said eyes, the spring $f$, secured at one end to the rod $b$, and bearing at its other end against the rod $e'$, and the set-screw $g$.

2. The combination of the rod $b$, having set therein the screw-eyes $d$ and $d'$, the rod $e$, mounted in said eyes, the spring $f$, set-screw $g$, the screw-eye $h$ and staple $i$, set in the rod $e$, and the conducting and lamp-supporting wire or cable $j$, clamped firmly to said rod $e$ by the staple $i$.

3. In combination with the arm-carrying ball B, a saddle and spring for pressing upon said ball, the regulating-screw E, having formed upon its periphery a series of teeth or serrations $k$, and the socket A, to receive said ball, saddle, spring, and adjusting-screw, and having cut through its wall a slot or slots $l$, for the introduction of a tool to turn said screw.

4. In an incandescent-electric-lamp support, the combination of a lamp-supporting arm, a ball connected to one end of said arm by a stem or shank, a socket to receive said ball having an opening of less diameter than said ball for the passage of said stem or shank, and having cut through its wall at said contracted end a slot or slots $n$, substantially as described.

5. The combination of an extensible lamp-supporting arm, a ball secured to one end of said arm by a stem or shank, the socket A, provided with the slots $l$ and $n$, the saddle D, the spring $m$, and the regulating-screw E, having the serrated or toothed section $k$.

In testimony whereof I have signed my name to this specification, in the presence of two subscribing witnesses, on this 25th day of May, A. D. 1889.

ALFRED DAWES.

Witnesses:
 N. C. LOMBARD,
 GEORGE A. SEWALL.